(12) United States Patent
Liu

(10) Patent No.: US 7,952,155 B2
(45) Date of Patent: May 31, 2011

(54) REDUCED EDGE EFFECT FROM RECESSES IN IMAGERS

(75) Inventor: Saijin Liu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 755 days.

(21) Appl. No.: 11/708,790

(22) Filed: Feb. 20, 2007

(65) Prior Publication Data

US 2008/0198248 A1 Aug. 21, 2008

(51) Int. Cl.
*H01L 31/0232* (2006.01)

(52) U.S. Cl. .......... 257/432; 257/40; 257/E31.121; 257/E31.127

(58) Field of Classification Search ....... 438/57–70; 257/432, 98, 586, 635, 40, E31.121, E31.127
See application file for complete search history.

(56) References Cited

U.S. PATENT DOCUMENTS

| | | | | |
|---|---|---|---|---|
| 5,651,857 A * | 7/1997 | Cronin et al. | ................. | 438/696 |
| 5,889,227 A * | 3/1999 | Wardecki | ................. | 102/259 |
| 6,228,747 B1 * | 5/2001 | Joyner | ................. | 438/436 |
| 2002/0027296 A1 * | 3/2002 | Badehi | ................. | 257/783 |
| 2004/0218115 A1 * | 11/2004 | Kawana et al. | ................. | 349/71 |
| 2005/0023635 A1 * | 2/2005 | Mouli et al. | ................. | 257/510 |
| 2006/0108576 A1 * | 5/2006 | Laermer et al. | ................. | 257/40 |
| 2006/0113622 A1 * | 6/2006 | Adkisson et al. | ................. | 257/443 |
| 2006/0214195 A1 * | 9/2006 | Kobayashi et al. | ................. | 257/222 |
| 2006/0214203 A1 | 9/2006 | Li et al. | | |
| 2006/0220192 A1 * | 10/2006 | Kurachi et al. | ................. | 257/669 |
| 2006/0256221 A1 | 11/2006 | McKee et al. | | |
| 2006/0284057 A1 * | 12/2006 | Park | ................. | 250/226 |
| 2006/0292731 A1 * | 12/2006 | Kim | ................. | 438/57 |
| 2007/0010042 A1 * | 1/2007 | Li | ................. | 438/70 |
| 2007/0042154 A1 * | 2/2007 | Hancer et al. | ................. | 428/64.1 |
| 2007/0158772 A1 * | 7/2007 | Boettiger | ................. | 257/432 |
| 2008/0054386 A1 * | 3/2008 | Akram | ................. | 257/432 |

OTHER PUBLICATIONS

Bao et al., "Polymer inking as a micro-and nanopatterning technique," *J. Vac. Sci. Technol.* B21(6), Nov./Dec. 2003, pp. 2749-2754.
U.S. Appl. No. 11/213,937, filed Aug. 30, 2006, McKee et al.
U.S. Appl. No. 11/513,246, filed Aug. 31, 2006, Salman Akram.
Double Patterning, http://en.wikipedia.org/wiki/Double_patterning, pp. 1-6, Sep. 22, 2009.
Surface Energy, http://en.wikipedia.org/wiki/Surface_energy, pp. 1-3, Aug. 5, 2009.

(Continued)

*Primary Examiner* — Thanh V Pham
*Assistant Examiner* — Duy T Nguyen
(74) *Attorney, Agent, or Firm* — Knobbe Martens Olson & Bear LLP

(57) ABSTRACT

Methods for making a recessed color filter array for a semiconductor imager employing a sidewall spacer for reducing an edge effect from the array are disclosed. In one embodiment, a substrate is provided having an upper surface. Then, a recess is formed into the upper surface of the substrate. The recess has a bottom and a sidewall. Subsequently, a sidewall spacer is formed on the sidewall of the recess. A color resist is deposited into the recess after forming the sidewall spacer. In the embodiment, the sidewall spacer is formed of a material having a surface energy lower than that of a material defining the bottom of the recess. The color resist adheres less to the sidewall than to the bottom of the recess. Thus, the color resist does not conform to a shape of an edge portion of the recess, thereby reducing the edge effect.

25 Claims, 20 Drawing Sheets

OTHER PUBLICATIONS

Substance Properties: Solids Selected Literature Values for Surface Free Energy of Solids, http://www.kruss.de/en/theory/substance-properties/solids.html, pp. 1-5, Aug. 5, 2009.

Wikipedia, Parylene, available at http://en.wikipedia.org/wiki/Parylene, pp. 1-4, last visited on Jul. 29, 2010.

* cited by examiner

FIG. 1B

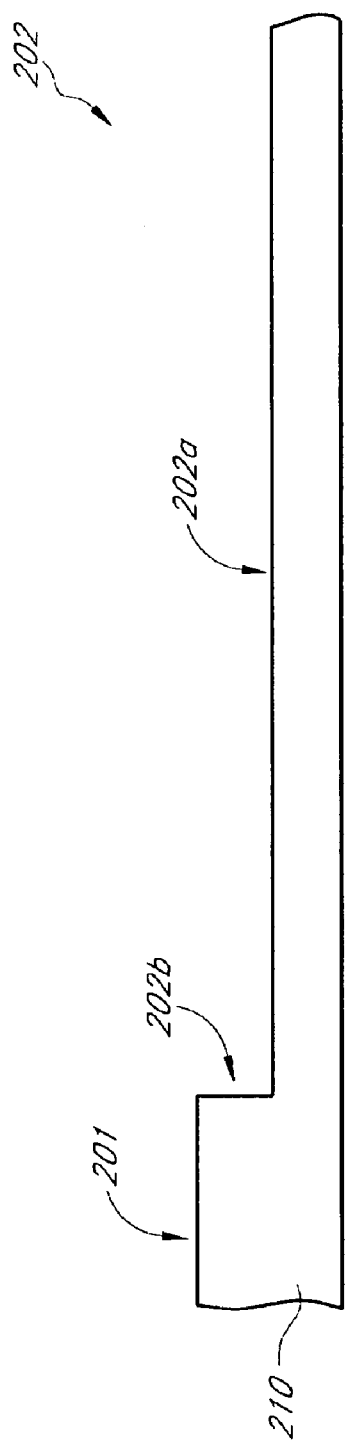
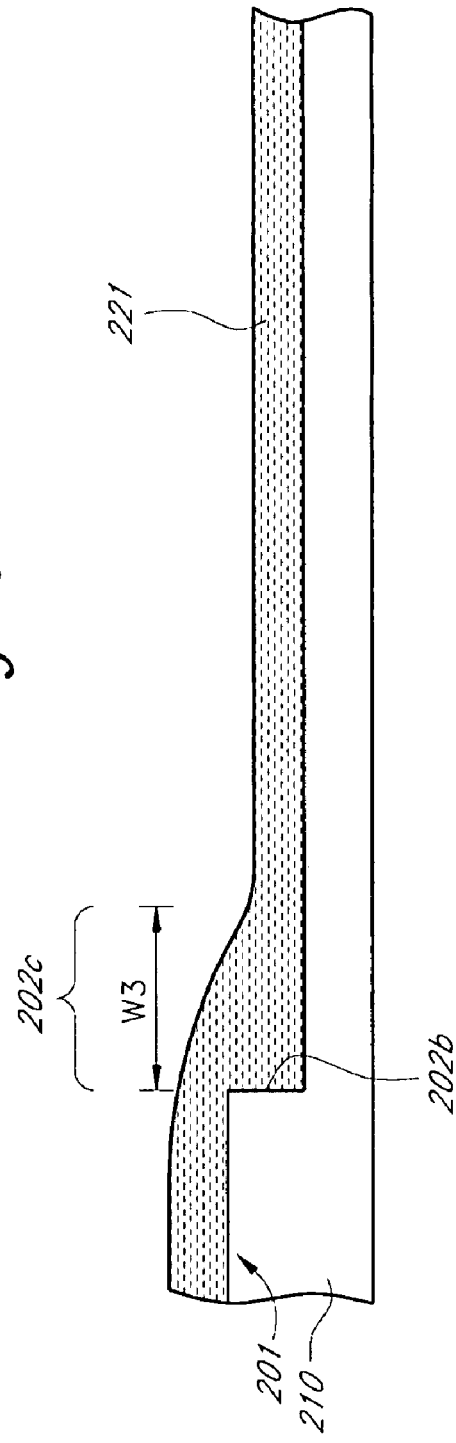
FIG. 2A
FIG. 2B

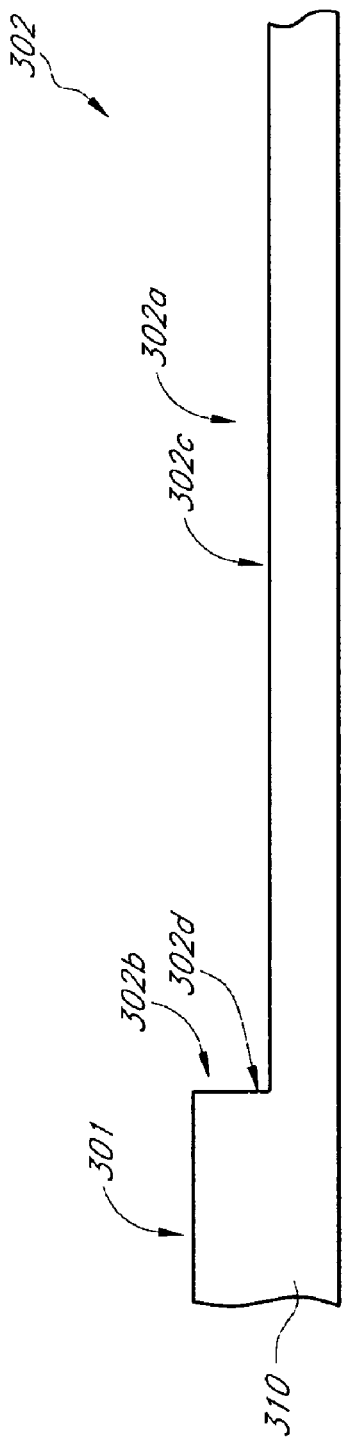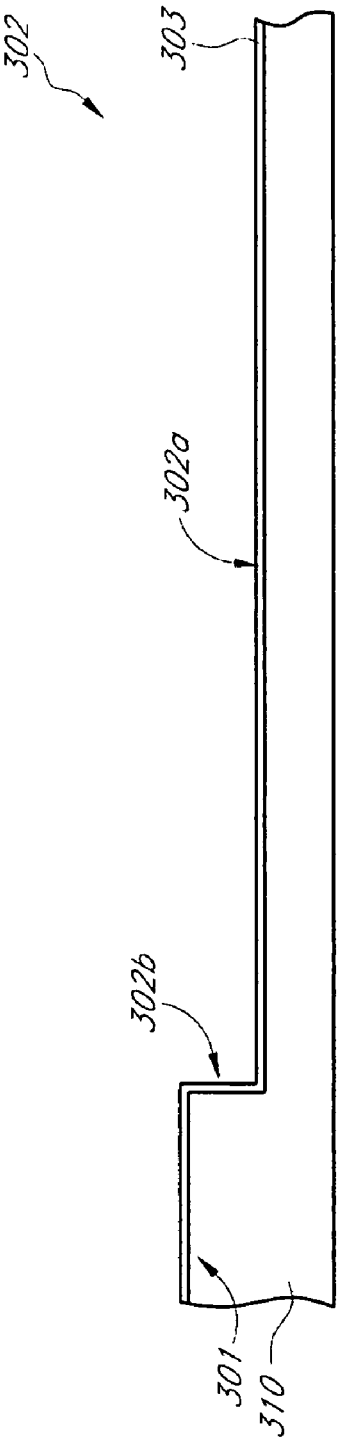

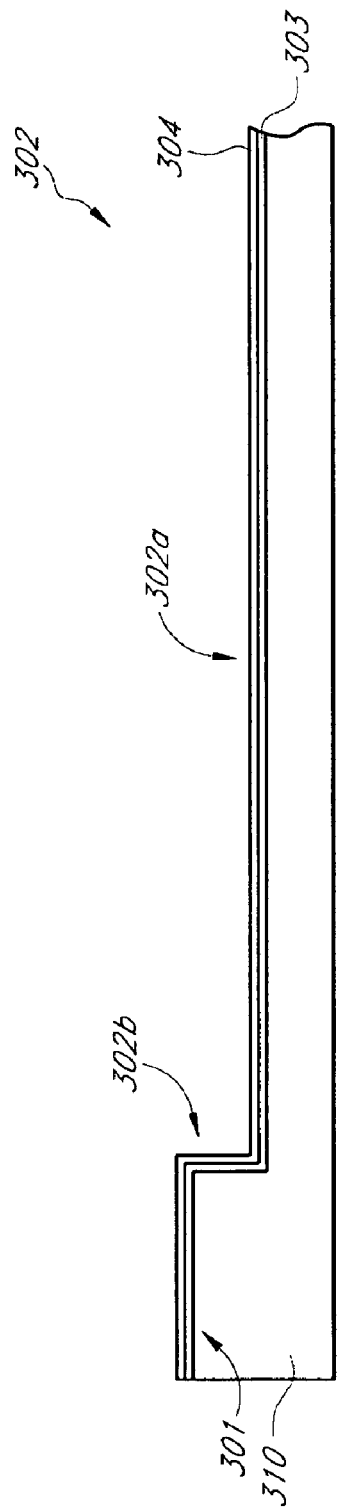
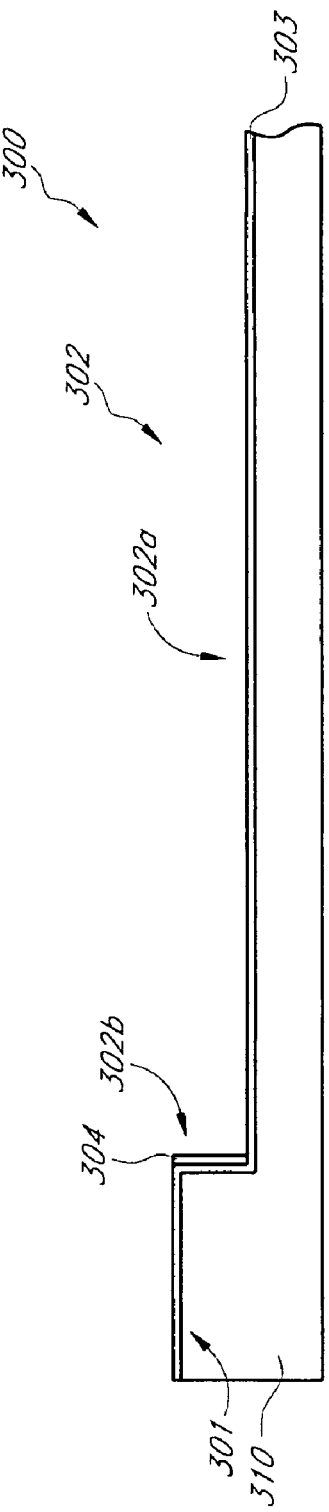
FIG. 3C
FIG. 3D

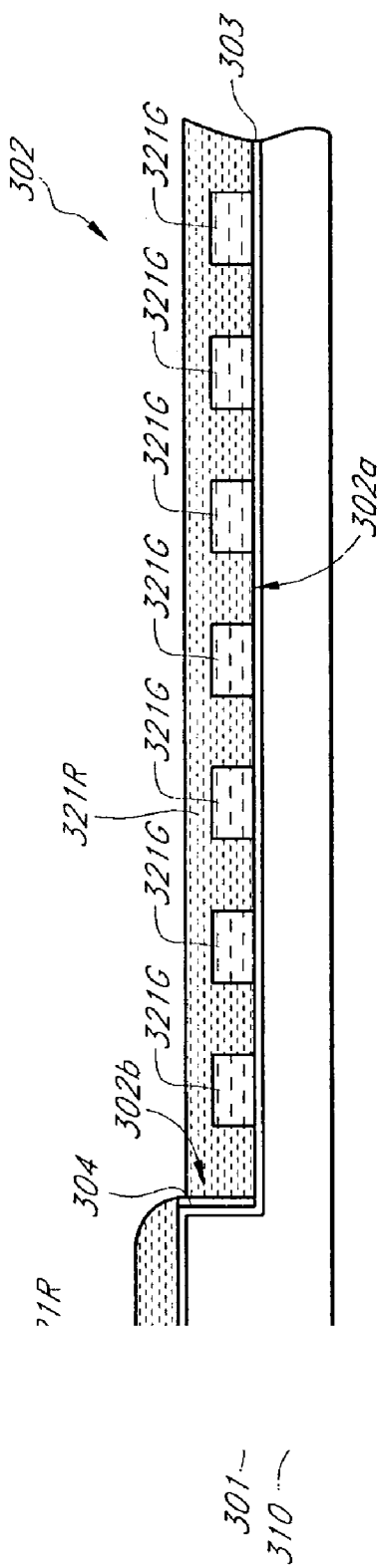
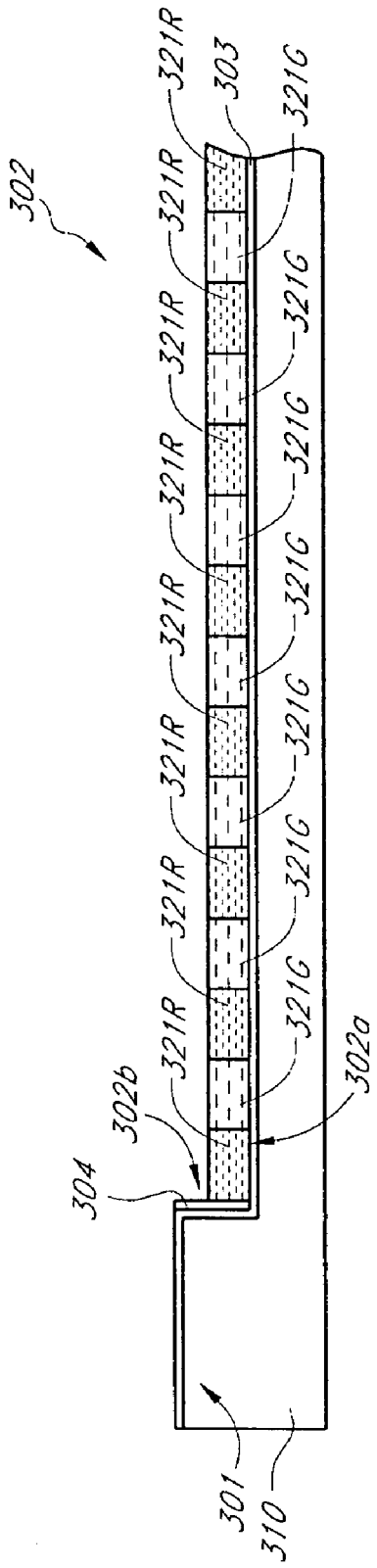
FIG. 3G
FIG. 3H

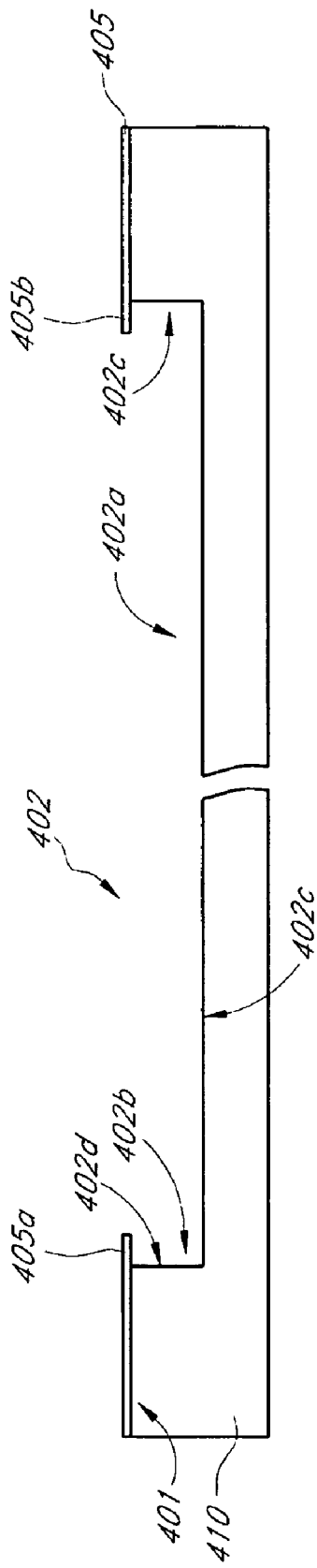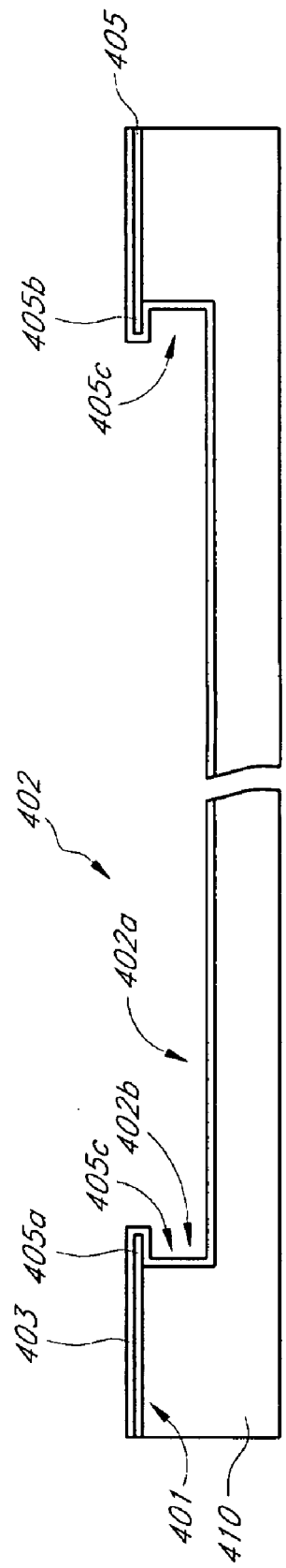
FIG. 4C
FIG. 4D

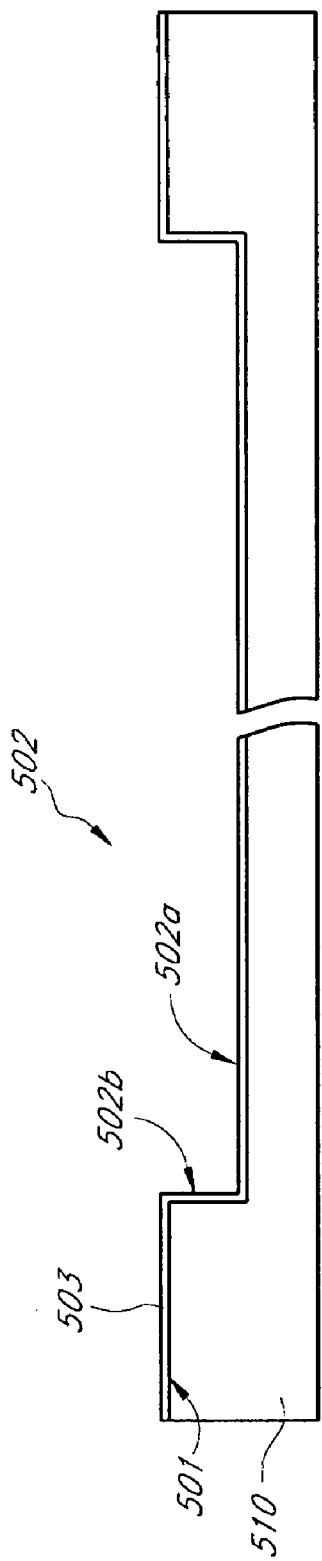
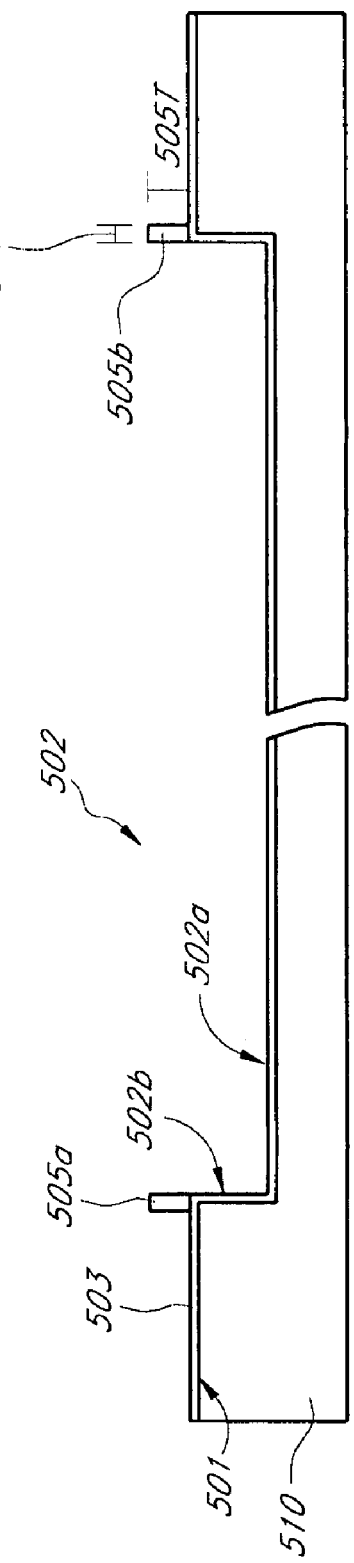

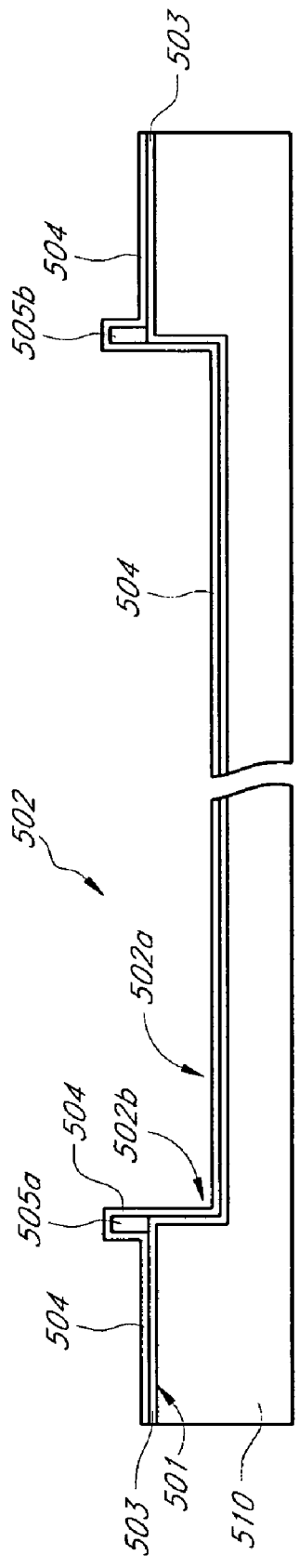
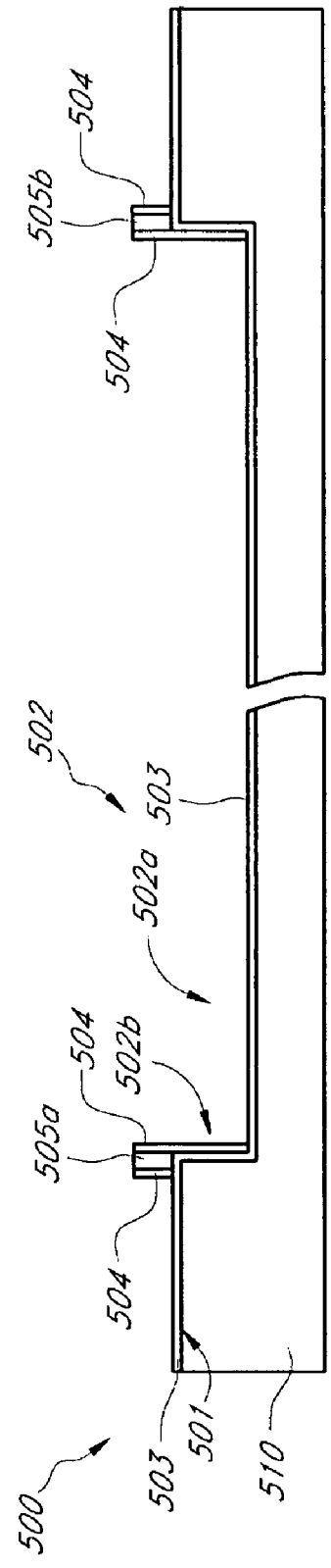
FIG. 5E
FIG. 5F

REDUCED EDGE EFFECT FROM RECESSES IN IMAGERS

BACKGROUND OF THE INVENTION

1. Field of the Invention

Embodiments of the invention relate to imagers, and more particularly to semiconductor imagers having recessed color filter arrays.

2. Description of the Related Art

Recent developments in the electronics industry have increased demand for imagers that digitally capture images. Among other things, semiconductor imagers (e.g., CMOS imagers) are known to provide certain advantages over other types of imagers, for example, small system size, low power consumption, camera-on-a-chip integration, and low fabrication costs.

As semiconductor imagers are used in smaller devices, there has been a need to reduce the sizes of semiconductor imagers. Attempts have been made to provide a semiconductor imager with a small stack height.

One approach is to use a recessed color filter array (CFA), as discussed in co-owned, pending U.S. application Ser. No. 11/513,246, filed Aug. 31, 2006 entitled RECESSED COLOR FILTER ARRAY AND METHOD OF FORMING THE SAME. A color filter array is an imager component which filters lights of different colors prior to conversion of an image into an electrical signal. A typical color filter array is formed on an imager substrate. Unlike the typical color filter array, a recessed color filter array is positioned in a recess formed into an imager substrate. An imager with a recessed color filter array thus has a reduced stack height.

BRIEF DESCRIPTION OF THE DRAWINGS

The embodiments will be better understood from the Detailed Description of the Embodiments and from the appended drawings, which are meant to illustrate and not to limit the embodiments, and wherein:

FIG. 1B is a schematic partial top plan view of the recessed color filter array of FIG. 1A, illustrating the distribution of color filters in accordance with one embodiment;

FIGS. 2A and 2B are schematic cross-sections partially illustrating one process of making a recessed color filter array;

FIGS. 3A-3I are schematic cross-sections illustrating a process of making a recessed color filter array in accordance with one embodiment;

FIGS. 4A-4G are schematic cross-sections illustrating a process of making a recessed color filter array in accordance with another embodiment;

FIGS. 5A-5G are schematic cross-sections illustrating a process of making a recessed color filter array in accordance with yet another embodiment;

DETAILED DESCRIPTION OF EMBODIMENTS

Semiconductor Imager with Recessed Color Filter Array

Figure 1A:
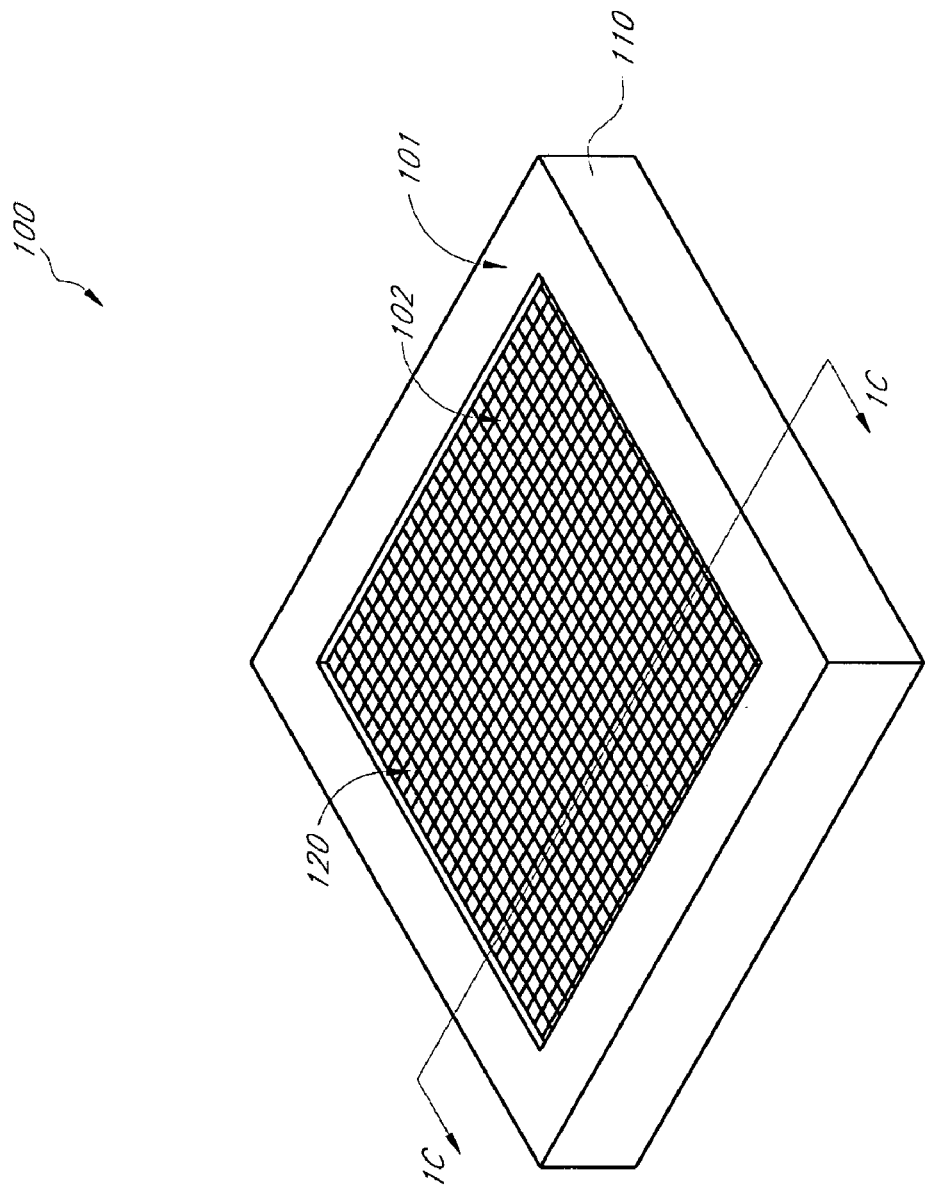
FIG. 1A is a schematic perspective view of a semiconductor imager having a recessed color filter array in accordance with one embodiment.

FIG. 1A illustrates an exemplary imager 100 according to one embodiment. The imager 100 includes a substrate 110 having an upper surface 101. The substrate 110 includes a recess 102 formed into the upper surface 101. The imager 100 also includes a color filter array (CFA) 120 in the recess 102. The illustrated color filter array 120 includes a plurality of color filters arranged in a matrix pattern. The skilled artisan will appreciate that the imager 100 is a single die generally formed by semiconductor processing (e.g., patterning, doping, depositing, etching, etc.) several such devices on a single substrate (e.g., silicon wafer) and subsequently dicing.

The color filters of the illustrated embodiments include color filters of different colors. In one embodiment, the color filters include red (R), green (G), and blue (B) color filters. The R, G, and B color filters may be arranged in various patterns.

Figure 1B:
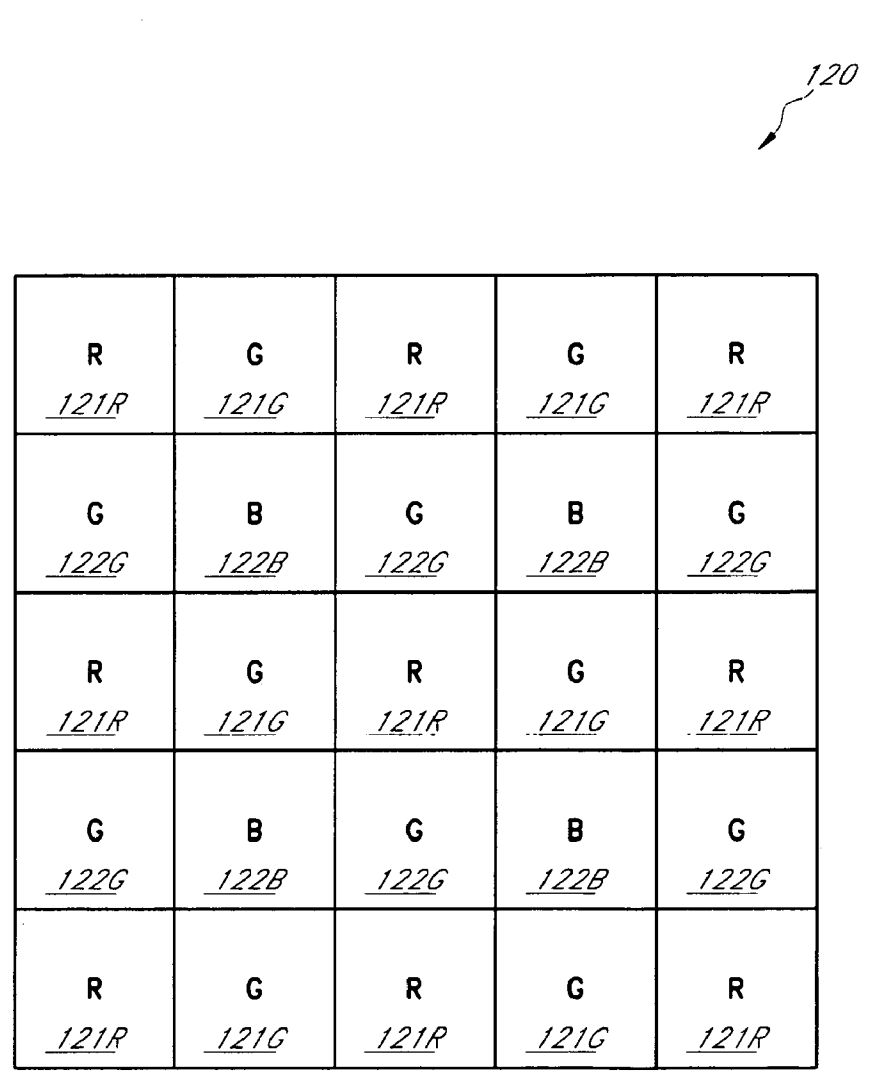

Referring to FIG. 1B, the illustrated filter pattern is 50% green, 25% red, and 25% blue. The filters 121R, 121G for pixels in every two rows in the array 120 have a repeating pattern of R, G, R, G. The filters 122G, 122B for pixels in the other alternating rows have a repeating pattern of G, B, G, B. A well-known exemplary pattern is the Bayer pattern, which follows the characteristics noted above. In another embodiment, each row in the array may have a repeating pattern of R, G, B, R, G, B.

Figure 1C:
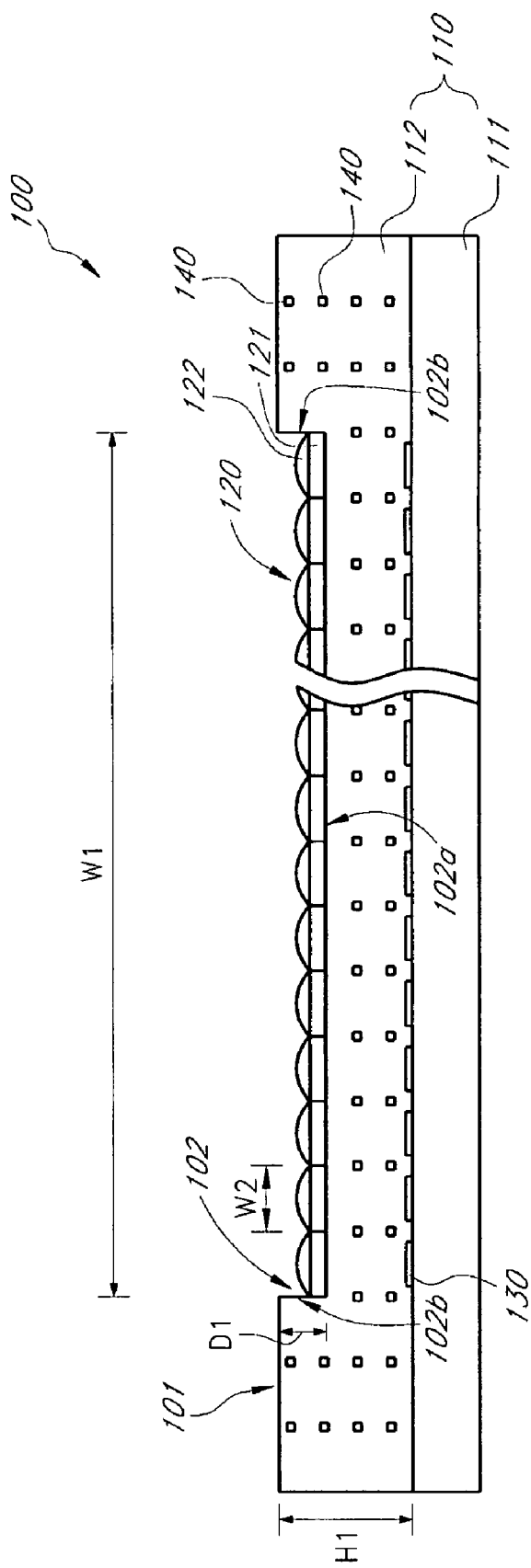
FIG. 1C is a schematic cross-section of the semiconductor imager of FIG. 1A, taken along the lines 1C-1C.

FIG. 1C is a cross-section of the imager 100 of FIG. 1A, taken along the lines 1C-1C. The illustrated imager 100 includes a base plate 111, a dielectric structure 112, a color filter array 120, photodiodes 130, and conductive lines 140 at various metal levels. In the context of this document, the base plate 111 and the dielectric structure 112 and all other integrated features may be collectively referred to as a "substrate" 110.

The base plate 111 serves as a template which supports the photodiodes 130 and the dielectric structure 112. In addition, the base plate 111 may include embedded electronic circuits for the imager 100. In one embodiment, the base plate 111 is formed of, for example, a semiconductor such as a silicon wafer. In other embodiments, the base plate 111 may have a silicon-on-insulator (SOI) structure, a silicon-on-sapphire (SOS) structure, doped and undoped semiconductors, epitaxial layers of silicon supported by a base semiconductor foundation, or other semiconductor structures. The semiconductor need not be silicon-based. The semiconductor may be silicon-germanium, germanium, or gallium arsenide or other semiconductor materials. The base plate 111 may have a thickness on the order of about 500 μm for a 300 mm wafer.

The dielectric structure 112 is formed as a series of inter-level dielectric layers between metallization levels on the base plate 111. The dielectric structure 112 provides insulation between conductive components of the imager 100 while supporting the color filter array 120. In one embodiment, the dielectric structure 112 may include a form of silicon oxide such as BPSG, TEOS, low k dielectrics (fluorine- and/or carbon-doped porous materials, etc.), spin-on glass, or polymers such as polyamide. The dielectric structure 112 may have an overall thickness H1 from about 4 μm to about 6 μm. The dielectric structure 112 has an upper surface 101 facing away from the base plate 111.

The dielectric structure 112 includes a recess 102 formed into the upper surface 101. The recess 102 may have various shapes, e.g., square, rectangular, or circular shape, when viewed from over the dielectric structure 112. In the illustrated embodiment, the recess 102 has a depth D1 of about 1 µm to about 3 µm, for example about 2 µm. The recess 102 may have a width W1 from about 4 mm to about 5 mm, but may vary widely depending on the size of the die. The recess 102 has a bottom 102a and a sidewall 102b. The terms "bottom" and "sidewall" of a recess refer to the general region of the recess, rather than particular surfaces, and thus are intended to be generic to the presence or absence of lining layers within the recess. Thus, in one embodiment, surfaces of the dielectric structure 112 may form the bottom and sidewall of the recess. In other embodiments, there may be an additional layer between the bottom/sidewall and the dielectric structure 112. In the context of this document, the terms "bottom surface" and "sidewall surface" of a recess only refer to the surfaces defined by the dielectric structure 112 of the substrate 110.

The color filter array 120 is formed on the bottom 102a of the recess 102. The illustrated color filter array 120 does not protrude beyond the level of the upper surface 101 of the dielectric structure 112. Thus, this configuration allows the stack height of the imager 100 to be the same as or less than the thickness of the dielectric structure 112. In the context of this document, the term "stack height" refers to the height of layers above the photodiodes 130 within the base plate 111 to the top points of the color filter array 120 (i.e., excluding any subsequent lens structures).

The color filter array 120 includes a plurality of color filters 121 and a plurality of lenses 122 formed on the color filters 121. The color filters 121 are arranged in a predetermined pattern, as described above with reference to FIG. 1B. The color filters 121 may be formed of a partially transparent material containing a pigment. An example of the partially transparent material is a colored photoresist. A skilled artisan will appreciate that various materials may be used for the color filters 121. The lenses 122 are formed of a substantially transparent material, e.g., propylene glycol monoethylether acetate (PGEEA).

The photodiodes 130 are embedded in, formed on, or otherwise integral with the base plate 111. The photodiodes 130 are arranged in a predetermined pattern corresponding to the color filter array pattern. Each of the photodiodes 130 is configured to convert light into an electrical signal. The photodiodes 130 are together configured to provide image signals corresponding to an image or sequence of images to which the imager 100 is exposed. One of the color filters 121, one of the lenses 122, and one of the photodiodes 130 are vertically aligned with one another, and together form a single pixel. In one embodiment, a single pixel has a width W2 from about 1.4 µm to about 6 µm. Each pixel is also associated with circuit elements (not shown) controlling amplification and readout functions, such as a transfer transistor, reset transistor, row select transistor, source follower transistor and floating diffusion node. In some arrangements, one of more of these circuit elements may be shared among multiple pixels.

The conductive lines 140 are embedded in the dielectric structure 112. Some of the conductive lines 140 are positioned under the recess 102 while others are positioned lateral to the recess 102 or lateral to the conductive lines under the recess 102. The conductive lines 140 under the recess 102 are positioned so as to avoid or minimize blocking light paths between the color filters 122 and the photodiodes 130. The conductive lines 140 serve to provide electrical connection between various components of the imager 100.

Formation of Color Filter Array

FIGS. 2A and 2B illustrate an exemplary process of forming a recessed color filter array for a semiconductor imager. Referring to FIG. 2A, a substrate 210 (which may include integrated dielectric and metal layers as described above with respect to FIG. 1C) is provided having an upper surface 201. The substrate 210 includes a recess 202 formed into the upper surface 201. The recess 202 has a bottom 202a and a sidewall 202b. The recess 202 may be formed by any suitable process, including, but not limited to, photolithography and etching. In the illustrated embodiment, the recess 202 may have a depth of about 1 µm to about 3 µm, for example about 2 µm. Although not shown, the substrate 210 may be provided with a passivation layer on the upper surface 201 of the substrate 210 and/or on the bottom and sidewall surfaces 202a, 202b of the recess 202. The passivation layer may be formed of silicon nitride ($Si_3N_4$).

Referring to FIG. 2B, a color resist 221 is deposited into the recess 202 and on the upper surface 201 of the substrate 210. The color resist 221 forms a color filter layer for the imager. The color resist 221 may include a photosensitive material, a binder, a pigment, and various additives. The color resist 221 may be deposited using any suitable method. In the illustrated method, the color resist 221 is deposited using spin coating.

The color filter layer 221 formed by the illustrated method tends to have a non-uniform thickness at an edge region 202c of the recess 202 near the sidewall 202b thereof. The color filter layer 221 is thicker at the edge region 202c of the recess 202 than at other regions of the recess 202. In the context of this document, this phenomenon is referred to as an "edge effect." The edge effect occurs because the surface tension of the color resist 221 forces the color resist 221 to somewhat conform to the shape of the recess 202. In certain instances, the edge region 202c where the edge effect occurs may have a horizontal width W3 from about 50 µm to about 100 µm from the sidewall 202b.

Figure 2C:
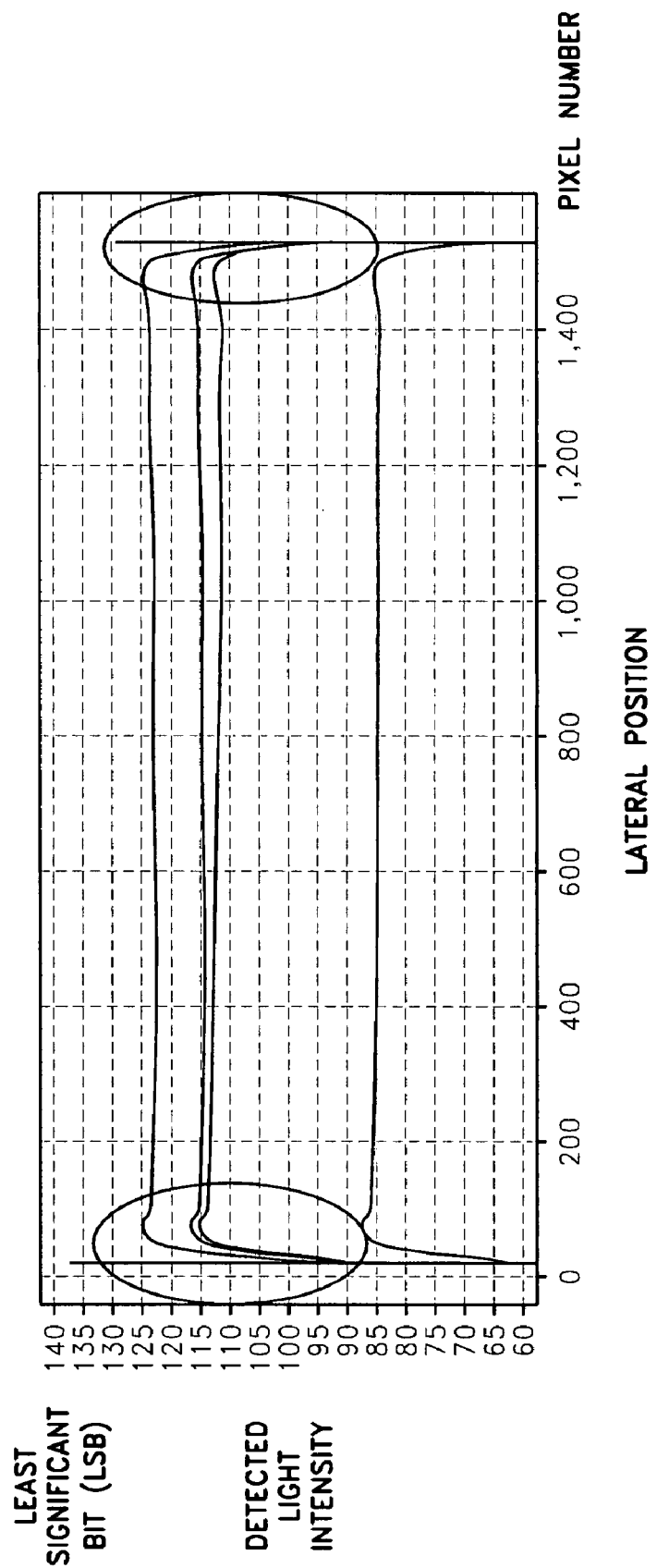
FIG. 2C is a graph showing signal drops at the edges of a recessed color filter array made by the process of FIGS. 2A and 2B.

The edge effect causes signal drops (up to about 25%) at pixels within edge regions of a recessed color filter array. FIG. 2C is a graph showing such light intensity signal drops due to the edge effect. In FIG. 2C, two circles indicate signal drops at or near two opposing edges of a recessed color filter array. Signals indicated by the circles are significantly lower than those in the region between the edges.

In one embodiment, the sidewall of the recess is treated prior to depositing a color filter material in order to mitigate or prevent the edge effect, particularly to reduce surface energy on adhesion characteristics. The sidewall may be selectively surface-treated so as to have a low surface energy relative to other surfaces of the imager. In one embodiment, a layer or spacer having a low surface energy is formed on the sidewall of the recess. In other embodiments, a protrusion is formed at or near a boundary between the recess and the upper surface of the substrate. The protrusion encourages the color filter material to be discontinuous between the recess and the substrate upper surface, thus reducing surface tension in the deposited color filter material. The protrusion may be vertical, horizontal, or at a certain angle relative to the substrate upper surface.

Figure 3E:
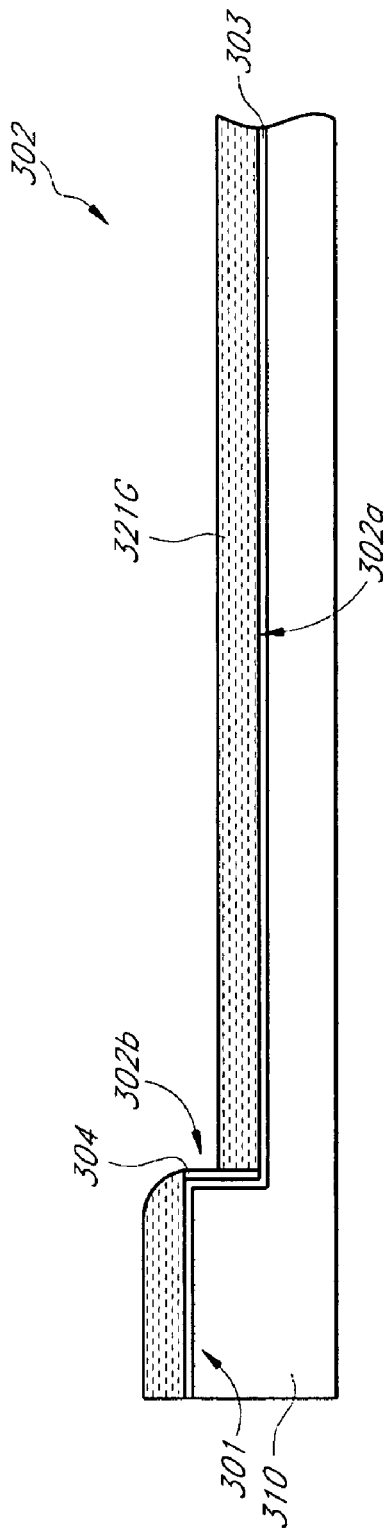

FIGS. 3A-3I illustrate a process of forming a recessed color filter array according to one embodiment. Referring to FIG. 3A, a substrate 310 is provided having an upper surface 301. The illustrated portion of the substrate 310 may include an integrated dielectric structure, and the substrate 310 of the illustrated embodiment is also otherwise as described above with reference to FIG. 1C. The substrate 310 thus also includes a base plate or workpiece (e.g., silicon wafer) underlying the dielectric structure. The substrate 310 may also include conductive lines (not shown) and photodiodes (not shown) embedded therein, as described above with respect to the conductive lines 140 and the photodiodes 130 of FIG. 1C.

The substrate 310 includes a recess 302 formed into the upper surface 301. The recess 302 has a bottom surface 302c at the bottom 302a of the recess 302 and a sidewall surface 302d at the sidewall 302b. The recess 302 may be formed by any suitable process, including, but not limited to, photolithography and etching. In the illustrated embodiment, the recess 302 may have a depth of about 1 μm to about 3 μm, for example about 2 μm.

Next, in the illustrated embodiment, a passivation layer 303 is formed conformally on the upper surface 301 of the substrate 310 and on the bottom and sidewall surfaces 302c, 302d of the recess 302, as shown in FIG. 3B. The passivation layer 303 is configured to seal surfaces of the substrate 310, including the surfaces 302c, 302d of the recess 302. The passivation layer 303 serves to protect conductive lines, photodiodes, and various other components (e.g., circuits) under the recess 302 and the upper surface 301 of the substrate 310. The passivation layer 303 on at least the bottom 302a of the recess 302 may also provide a surface suitable for adhesion of a color filter material which will be described below. The passivation layer 303 may also be referred to as a "liner layer."

In one embodiment, the passivation layer 303 may be formed of silicon nitride ($Si_3N_4$). Silicon nitride has a surface energy of about 56.8 dynes/cm. The passivation layer 303 may have a thickness of about 150 Å to about 400 Å, for example about 220 Å. It will be appreciated that any suitable materials may be used for the passivation layer 303. Other exemplary passivation materials include silicon oxynitride ($SiO_xN_y$) and silicon carbide (SiC). It will also be appreciated that the passivation layer 303 may be omitted if the substrate material may provide sufficient protection over components embedded therein, and adhesion for the subsequent color filter material, in which case the bottom 302a and sidewall 302b would be defined by the dielectric structure.

Subsequently, an adhesion-reduction layer 304 is formed on the passivation layer 303, as shown in FIG. 3C. The adhesion-reduction layer 304 is formed of a material having a low surface energy or a hydrophobic material. In particular, the material has a surface energy lower than that of a material defining the bottom 302a of the recess 302. In the illustrated embodiment, the adhesion-reduction layer 304 has a surface energy lower than that of the passivation layer 303 which will define the bottom 302a of the recess 302, as will be better understood from description below. The surface energy of the passivation layer 303 may be from about 55 dynes/$cm^2$ to about 65 dynes/$cm^2$. The surface energy of the adhesion-reduction layer 304 may be not greater than about 40 dynes/$cm^2$, particularly from about 12 dynes/$cm^2$ to about 40 dynes/$cm^2$, and more particularly from about 12 dynes/$cm^2$ to about 30 dynes/$cm^2$.

The adhesion-reduction layer 304 may be formed of an organic material. In one embodiment, the adhesion-reduction layer 304 is formed of a self-assembled monolayer (SAM) material, particularly a fluorinated SAM material, such as 1H,1H,2H,2H-perfluorodecyltrichlorosilane (FDTS). FDTS has a surface energy of about 11.7 dynes/cm. A skilled artisan will appreciate that any suitable low surface energy or hydrophobic material may be used for the adhesion-reduction layer 304.

The adhesion-reduction layer 304 is formed conformally or isotropically over the upper surface 301 of the substrate and on the bottom and sidewall 302a, 302b of the recess 302. The adhesion-reduction layer 304 may have a thickness between about 10 Å and about 3,000 Å, depending on the material selection. In one embodiment, the adhesion-reduction layer 304 is formed using a spin coating process. It will be appreciated that any suitable deposition process may be used for forming the layer 304.

As shown in FIG. 3D, the adhesion-reduction layer 304 is then removed from the bottom 302a of the recess 302, while a portion of the layer 304 is maintained on the sidewall 302b of the recess 302. In the illustrated embodiment, the adhesion-reduction layer 304 is removed from substantially the entire portion of the bottom 302a of the recess 302. The portion remaining selectively on the sidewall 302b of the recess 302 is known as a "sidewall spacer." The sidewall spacer will generally have a width corresponding to the thickness of the spacer material deposited (e.g., about 10 Å to about 3,000 Å). In the case of SAMs, the spacer can accomplish its function in very thin layers (e.g., 1 to 15 monolayers, particularly about 10 Å to about 150 Å).

This removal process may be conducted using an anisotropic or directional etching process, also known in the art as a spacer etch when used to selectively remove horizontal portions of a layer while leaving vertical layers on sidewall surfaces. Such an anisotropic etching process may be a dry etching process. While a purely physical sputter etch (e.g., argon sputter etch) may be used, a reactive ion etch (RIE) may supply a chemical component that is selective for the spacer material and stops on the underlying material. In certain embodiments, the etching process may be non-selective to the underlying material and actually remove the spacer material by undercutting. In the embodiment in which the adhesion-reduction layer 304 is formed of FDTS, an exemplary etchant used in this removal step is $CF_4/O_2$ directional plasma. Because FDTS forms a very thin layer having a thickness of, for example, about 15 Å to about 30 Å, a high speed etchant may readily penetrate the thin FDTS layer. Thus, the etchant may reach the passivation layer 303, and may remove a little portion of the passivation layer 303 underneath the FDTS layer 304, thereby removing horizontal portions of the spacer material by undercutting. A skilled artisan will appreciate that various techniques may be employed to provide the structure shown in FIG. 3D.

The partially fabricated imager 300 shown in FIG. 3D minimizes or prevents the edge effect when a color resist is deposited into the recess 302. The imager 300 has different surface energies on the bottom and sidewall 302a, 302b of the recess 302. In the illustrated embodiment, the bottom 302a of the recess 302 has the passivation layer 303 having a first surface energy while the sidewall 302b of the recess 302 has the adhesion-reduction layer 304 having a second surface energy lower than the first surface energy. A difference between the first and second surface energies may be between about 20 dynes/$cm^2$ and about 45 dynes/$cm^2$, and particularly between about 30 dynes/$cm^2$ and about 45 dynes/$cm^2$. Thus, when a color filter material is deposited into the recess 302, it adheres less to the sidewall 302b than to the bottom 302a, thereby minimizing or preventing the edge effect. Yet, the adhesion of the color filter material on the bottom 302a of the recess 302 may be maintained because the bottom 302a of the recess 302 may include a liner material suitable for the adhesion.

Subsequently, a color filter material, particularly a color resist 321G, is deposited on the passivation layer 303 into the recess 302 and over the upper surface 301 of the substrate 310, as shown in FIG. 3E. The color resist 321G will be used to form a green color filter layer for the imager. The illustrated color resist 321G thus contains a green pigment. In one embodiment, the color resist includes at least one of propylene glycol monomethyl ether acetate (PGMEA), ethyl 3-ethoxypropionate (EEP), cyclohexanone and acrylic resin. The color resist may include various other additives depending on the materials used for the color filter array.

The color resist of the embodiment has a surface energy higher than the material of the sidewall spacer 304. In the illustrated embodiment, the color resist 321G has a surface energy of about 42 dynes/cm.

Figure 3F:
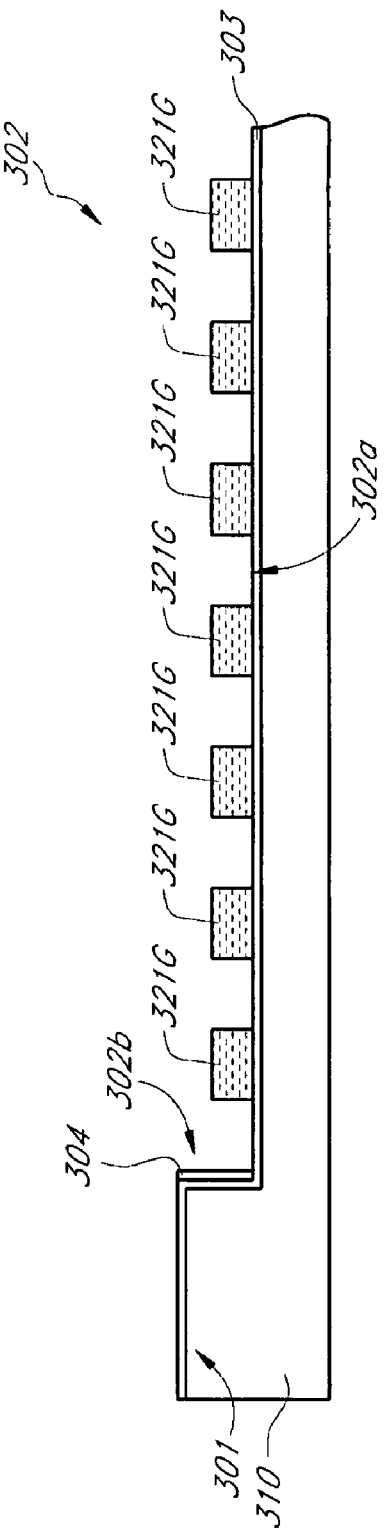

Then, the color filter layer 321G is patterned to provide spaces for color filters of other colors, as shown in FIG. 3F. The color filter layer 321G is also removed from the upper surface 301 of the substrate 310. The color filter layer 321G may be patterned or removed, using any suitable process, including, but not limited to, photolithography. In one embodiment, the color filter layer 321G is a photoresist material that is directly exposed and developed.

Next, a second color filter material, particularly a second color resist 321R, is deposited into the recess 302 and over the upper surface 301 of the substrate 310, as shown in FIG. 3G. This second color resist 321R fills the spaces between the green color filters 321G. The illustrated second color resist 321R includes a red pigment and thus will serve as a red color filter in the imager. The red color resist 321R is then patterned to provide spaces for color filters of yet another color, for example, blue.

Although not shown, a third color resist is deposited into the recess 302 and over the upper surface 301 of the substrate 310. The third color resist 321B fills the spaces between the patterned color filters 321G, 321R. In one embodiment, the third color resist includes a blue pigment and thus will serve as a blue color filter for the imager. The distribution of the color filters 321R, 321G, 321B may be as described above with reference to FIG. 1B. The third color resist is thinned such that blue color filters have a height the same as those of the red and green color filters 321R, 321G. In one embodiment, the blue color resist overlying the upper surface 301 of the substrate 310 is also removed, exposing the passivation layer 303 over the upper surface 301 of the substrate 310.

As described above, the adhesion-reduction layer 304 on the sidewall 302b of the recess 302 minimizes or prevents the edge effect during deposition of the color filter materials. Thus, the resulting color filters have a substantially uniform thickness across the substrate, including the edge regions of the recess 302. The color filters may have a thickness of about 0.5 μm to about 1.1 μm, e.g., about 0.9 μm.

Figure 3I:
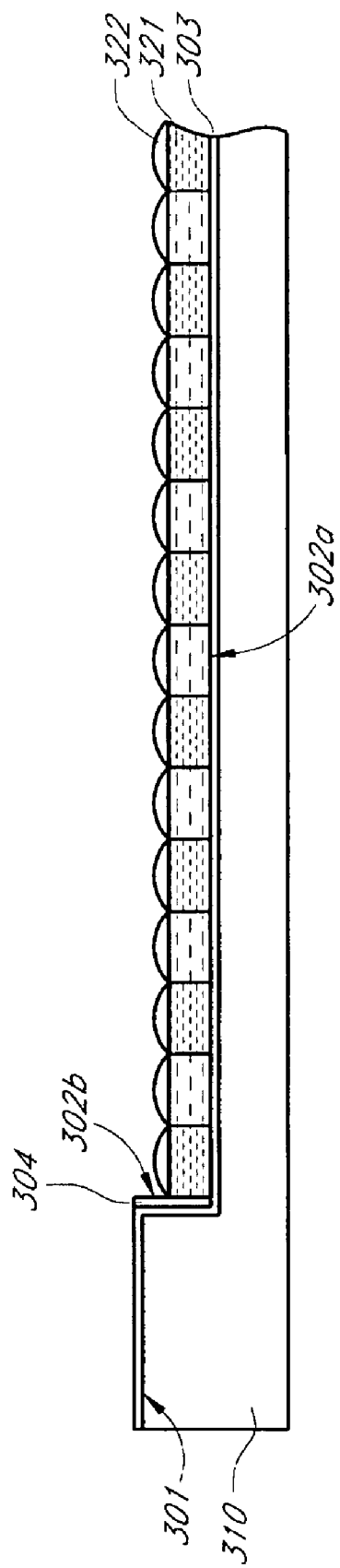

Finally, lenses 322 are formed on the color filters 321, as shown in FIG. 3I. It will be appreciated that any suitable process may be used to form the lenses 322.

FIGS. 4A-4G illustrate a process of forming a recessed color filter array according to another embodiment. In addition to the sidewall spacer as described above with reference to FIG. 3D, the illustrated method also includes providing a horizontal protrusion or reentrant profile at or near edges of a recess formed into a surface of a substrate. The horizontal protrusion further mitigates the edge effect by preventing a color filter layer from being continuous between the recess and the surface of the substrate during deposition.

Figure 4A:
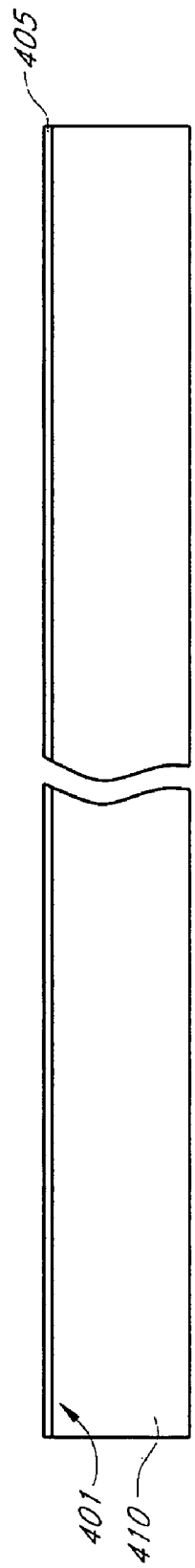

Referring to FIG. 4A, a substrate 410 is provided having an upper surface 401. Although not shown, the substrate 410 may have conductive lines, photodiodes, and the like embedded therein, as described above with reference to FIG. 1C.

Then, a hard mask (or protrusion-forming) layer 405 is formed on the upper surface 401 of the substrate 410. In one embodiment, the hard mask layer 405 is formed of a material such as silicon nitride ($Si_3N_4$) that is resistant to a suitably selective isotropic etch of dielectric structure to be recessed.

Figure 4B:
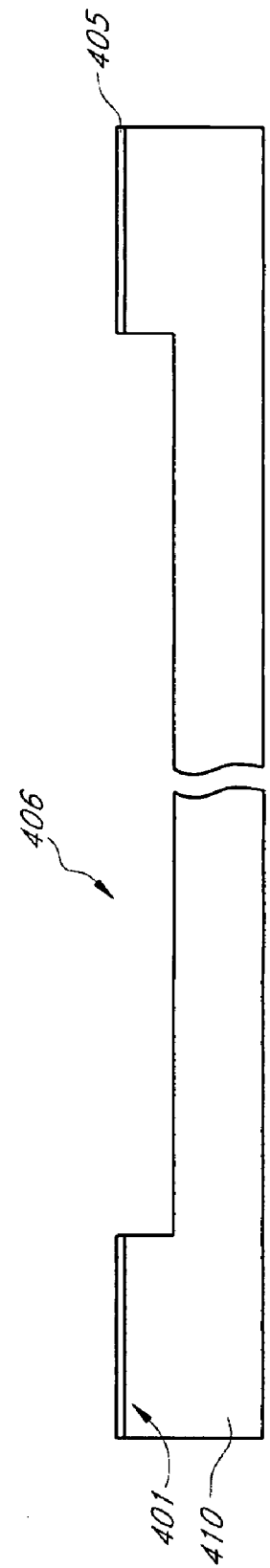

Subsequently, a portion of the hard mask layer 405 is removed, as shown in FIG. 4B. This step may be conducted, using any suitable process, including, but not limited to, photolithography. In one embodiment, this hard mask removal step may be conducted, using a dry etching process.

In addition, a portion of the substrate directly underlying the portion of the hard mask layer 405 is also removed, thereby forming an intermediate recess 406, as shown in FIG. 4B. As discussed with respect to the previous embodiments, the recess 406 is formed in a dielectric structure in which metallization levels are formed. As will be better understood from description below, the intermediate recess 406 has a size smaller than that of a recess 402 (FIG. 4C) which will be formed at the next step. The size may include a width and a depth. The depth of the intermediate recess 406 may be about 0.5 μm to about 2.5 μm.

This substrate material removal step may be conducted by continuing the etching process for removing the portion of the hard mask layer 405, using the same etchant while the photoresist mask remains in place. In another embodiment, the portion of the substrate 410 may be removed using a different etchant selective for the substrate material relative to the hard mask layer 405. In such an embodiment, the photoresist mask used to pattern the hard mask 405 is first removed and the hard mask layer 405 may serve as a mask for etching the substrate 410.

Subsequently, the intermediate recess 406 is expanded to create a protrusion 405a, 405b that shadows a reentrant region on the sidewall 402b, as shown in FIG. 4C. In other words, the sidewall 402b, and particularly the substrate's sidewall surface 402d takes on a reentrant profile. At this step, the size of the intermediate recess 406 is increased to a predetermined size, thereby completing formation of the recess 402. In the illustrated embodiment, the recess 402 may have a depth of about 1 μm to about 3 μm, for example about 2 μm. The hard mask layer 405, however, is maintained substantially intact on top of the substrate 410. As a result, the protrusion 405a, 405b is formed to extend substantially horizontally over the recess 402. Although not shown in FIG. 4C, the illustrated protrusion 405a, 405b is continuous and annular along the edge of the recess 402 when viewed from over the substrate 410. In other embodiments, however, discontinuous multiple protrusions are also possible.

At this step, any suitable etching process may be used to remove the substrate material. In one embodiment, an isotropic wet etching process is conducted using an etchant selective for the substrate material (dielectric structure) relative to the hard mask layer material. In the illustrated embodiment in which the dielectric structure is formed of silicon oxide, an etchant selective for silicon oxide relative to silicon nitride may be used at this step. In one embodiment, the etch recesses between about 0.5 μm and about 2.0 μm of the dielectric structure, and particularly between about 0.5 μm and about 1.0 μm.

Next, in the illustrated embodiment, a passivation layer 403 is deposited conformally into the recess and on the upper surface of the substrate 410, as shown in FIG. 4D. The deposition of the passivation layer 403 may be carried out using, for example, atomic layer deposition (ALD). The material of the passivation layer 403 may be as described above with respect to that of the passivation layer 303 of FIG. 3B. The passivation layer 403 may also cover the protrusion 405a, 405b. The illustrated passivation layer 403 covers the top, side, and bottom surfaces of the protrusion 405a, 405b.

In another embodiment in which the passivation layer is formed using chemical vapor deposition (CVD), the passivation layer may be less thick in the reentrant region 405c of the recess than in other regions of the recess. In yet another embodiment in which physical vapor deposition (PVD) is used to form the passivation layer, the passivation layer may be formed on the bottom 402a and sidewall 402b of the recess 402 and over the upper surface 401 of the substrate 410.

Figure 4E:
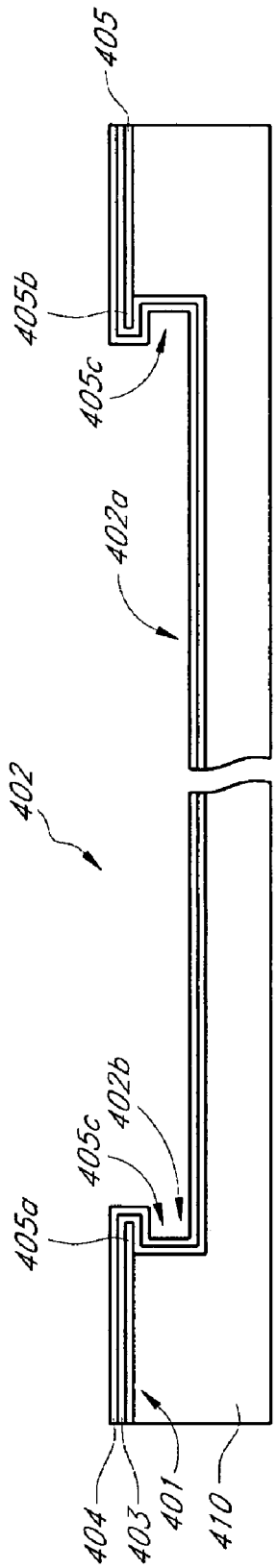

An adhesion-reduction layer 404 is then deposited conformally on the bottom and sidewall 402a, 402b of the recess 402 and over the upper surface 401 of the substrate 410, as shown in FIG. 4E. The adhesion-reduction layer 404 also covers the protrusion 405a, 405b. The deposition of the adhesion-reduction layer 404 may be carried out using, for example, atomic layer deposition (ALD) or chemical vapor deposition (CVD). The material of the adhesion-reduction layer 404 may be as described above with respect to that of the adhesion-reduction layer 304 of FIG. 3C.

Figure 4F:
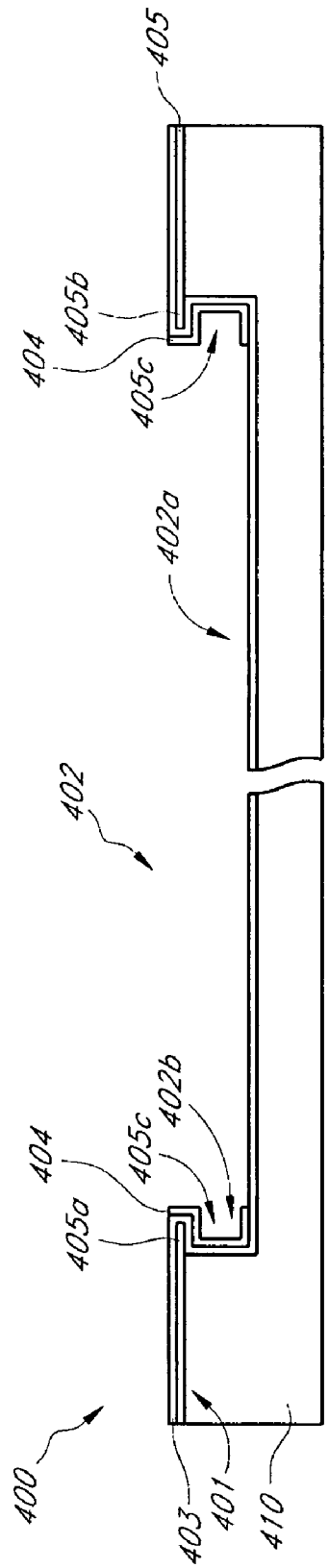

Then, the adhesion-reduction layer 404 is substantially removed from the bottom 402a of the recess 402 and the upper surface 401 of the substrate 410, as shown in FIG. 4F. The adhesion-reduction layer 404 is maintained on the sidewall 402b of the recess 402. The adhesion-reduction layer 404 is also maintained on the underside of the protrusion 405a, 405b. The illustrated adhesion-reduction layer 404 also remains on edge portions of the recess 402 underlying the protrusion 405a, 405b because the edge portions are shadowed during the removal step. This step may be conducted using an anisotropic or directional etching process. An etchant used in this step is selective for the adhesion-reduction layer 404 relative to the passivation layer 403. Details of this step may be as described above with respect to the step shown in FIG. 3D.

Figure 4G:
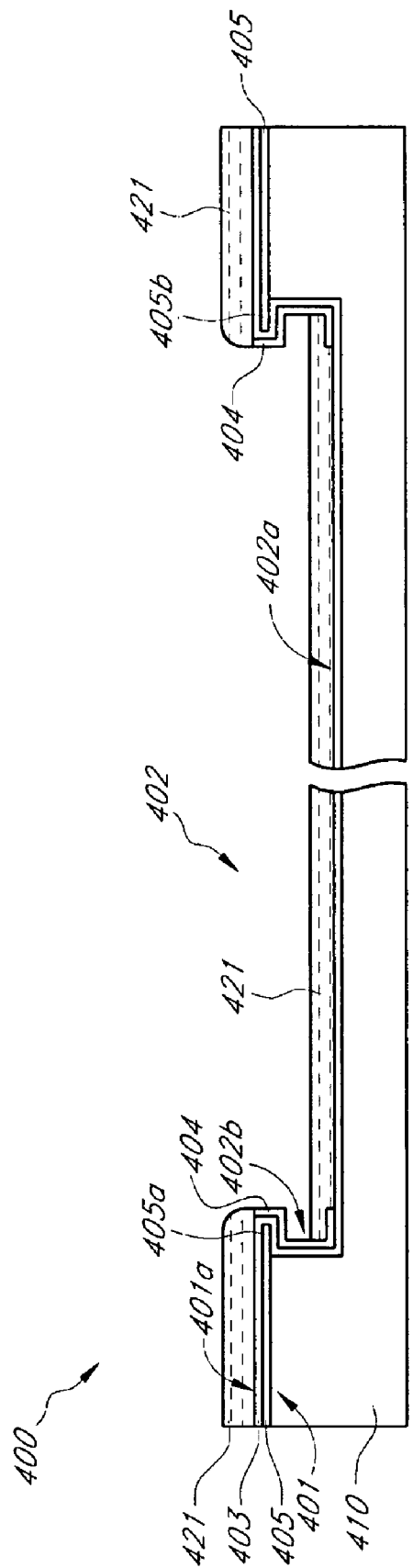

The partially fabricated imager 400 shown in FIG. 4F minimizes or prevents the edge effect when a color resist is deposited into the recess 402. The imager 400 has different surface energies on the bottom and sidewall 402a, 402b of the recess 402. The bottom 402a of the recess 402 has the passivation layer 403 having a first surface energy while the sidewall 402b of the recess 402 has the adhesion-reduction layer 404 having a second surface energy lower than the first surface energy. Thus, when a color filter material such as a color resist is deposited into the recess 402, it adheres less to the sidewall 402b than to the bottom 402a, thereby minimizing or preventing the edge effect. Yet, the adhesion of the color filter material on the bottom 402a of the recess 402 may be maintained because the bottom 402a of the recess 402 exposes a material suitable for the adhesion (in the illustrated embodiment the passivation layer 403). In addition, the protrusion 405a, 405b prevents the color resist from being formed continuously between the sidewall 402b of the recess 402 and the uppermost surface 401a of the substrate 410. FIG. 4G illustrates the resulting imager structure 400 with a color resist 421 deposited in the recess 402. Although not shown, subsequently, steps for patterning the color resist and steps for forming lenses are conducted, as described above with reference to FIGS. 3F-3I.

FIGS. 5A-5G illustrate a partial process of forming a recessed color filter array according to yet another embodiment. The illustrated method includes providing a vertical protrusion at or near an edge of a recess. Similar to the horizontal protrusion 405a, 405b shown in FIG. 4G, the vertical protrusion also mitigates the edge effect by preventing a color filter layer from being formed continuously between the recess and the surface of the substrate during deposition.

Figure 5A:
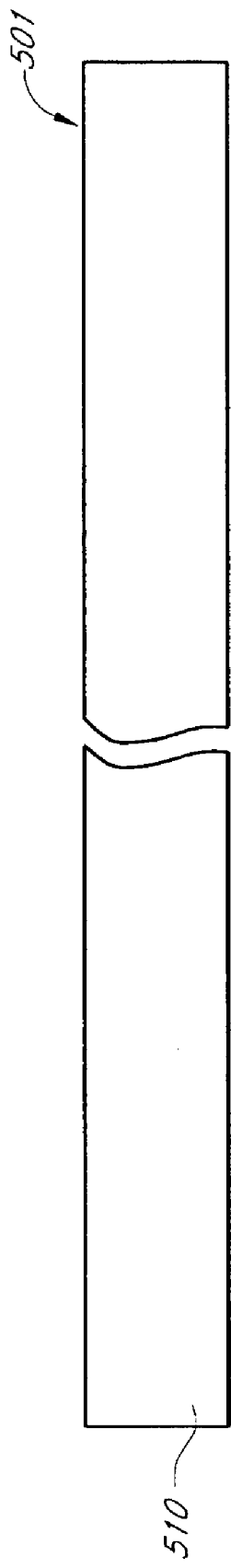

Referring to FIG. 5A, a substrate 510 is provided having an upper surface 501. Although not shown, the substrate 510 may have conductive lines, photodiodes, and the like embedded therein, as described above with reference to FIG. 1C.

Figure 5B:
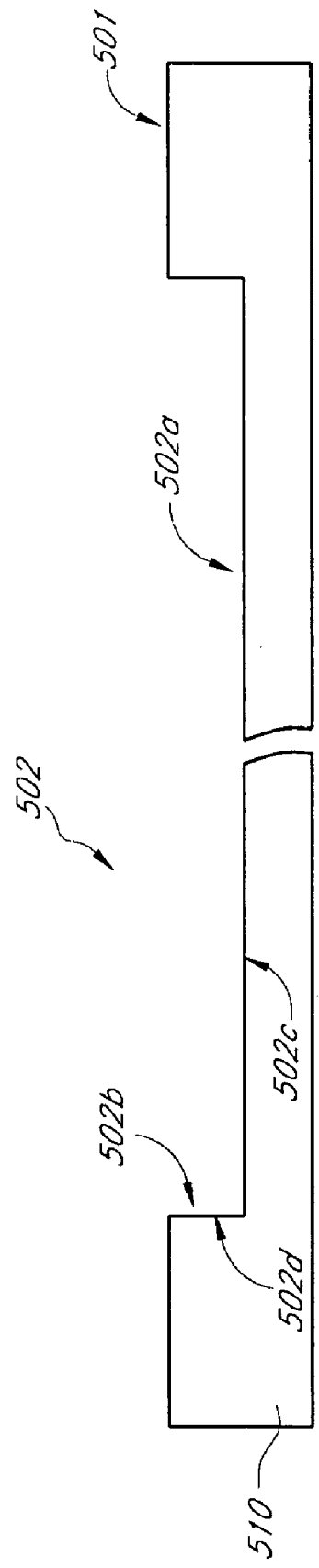

Then, a recess 502 is formed into the upper surface 501 of the substrate 510, as shown in FIG. 5B. The recess 502 has a bottom surface 502c at the bottom 502a of the recess 502 and a sidewall surface 502d at the sidewall 502b of the recess 502. The configuration of the recess 502 may be as described above with respect to the recess 102 of FIG. 1C. In the illustrated embodiment, the recess 502 may have a depth of about 1 µm to about 3 µm, for example about 2 µm.

Next, a passivation layer 503 is formed conformally on the bottom and sidewall surfaces 502c, 502d of the recess 502 and on the upper surface 501 of the substrate 510, as shown in FIG. 5C. The material of the passivation layer 503 may be as described above with respect to that of the passivation layer 303 of FIG. 3B. In certain embodiments, the passivation layer 503 may be formed only on the bottom surface 502c of the recess 502.

Then, a protrusion 505a, 505b is formed over the upper surface 501 of the substrate 510 proximate to the recess 502, as shown in FIG. 5D. Although not shown in FIG. 5D, the illustrated protrusion 505a, 505b is continuous and annular along the edge of the recess 502 when viewed from over the substrate 510. In other embodiments, however, discontinuous multiple protrusions are also possible. The protrusion 505a, 505b may be formed of any suitable material. In one embodiment, the protrusion 505a, 505b is formed of a material resistant to the spacer etch to be employed, such as silicon nitride ($Si_3N_4$). The protrusion 505a, 505b may be formed by any suitable process, including, but not limited to, photolithography. In one embodiment, the protrusion 505a, 505b may be formed by forming a layer with a protrusion-forming material and subsequently patterning the layer. The layer may have a thickness 505T of between about 0.3 µm and about 2 µm, and particularly between about 0.5 µm and about 1.0 µm.

The illustrated protrusion 505a, 505b has two side surfaces, one of which is approximately continuous with the sidewall 402b of the recess 402. The protrusion 505a, 505b may have a width 505W of about 0.1 µm to about 1.0 µm, and particularly about 0.2 µm to about 0.5 µm. In other embodiments, the protrusion 505a, 505b may be sloped by the etch process used to pattern it. The protrusion 505a, 505b may have an angle from about 0° to about 90° relative to the upper surface 501 of the substrate 510.

An adhesion-reduction layer 504 is then deposited conformally on the bottom and sidewall 502a, 502b of the recess 502 and over the upper surface 501 of the substrate 510, as shown in FIG. 5E. The illustrated adhesion-reduction layer 504 also covers the protrusion 505a, 505b. The material of the adhesion-reduction layer 504 may be as described above with respect to that of the adhesion-reduction layer 304 of FIG. 3C.

Then, the adhesion-reduction layer 504 is removed from substantially entire portion of the bottom 502a of the recess 502 and the upper surface 501 of the substrate 510 by an anisotropic spacer etch, as shown in FIG. 5F. The adhesion-reduction layer 504 is maintained on the sidewall 502b of the recess 502. The adhesion-reduction layer 504 is also maintained on the side surfaces of the protrusion 505a, 505b. This step may be conducted, using an anisotropic or directional etching process. An etchant used in this step is selective for the adhesion-reduction layer 504 relative to the passivation layer 503. Details of this step may be as described above with respect to the step shown in FIG. 4F.

Figure 5G:
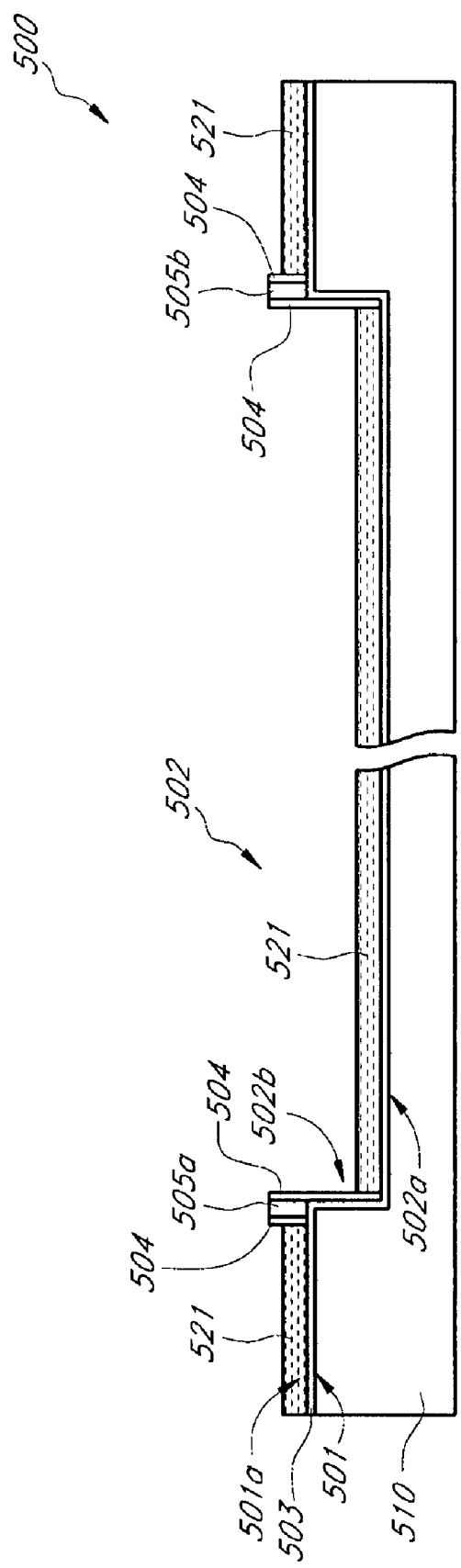

The partially fabricated imager 500 shown in FIG. 5F minimizes or prevents the edge effect when a color resist is deposited into the recess 502. The imager 400 has different surface energies on the bottom and sidewall 502a, 502b of the recess 502. The bottom 502a of the recess 502 has the passivation layer 503 having a first surface energy while the sidewall 502b of the recess 502 has the adhesion-reduction layer 504 having a second surface energy lower than the first surface energy. Thus, when a color filter material such as a color resist is deposited into the recess 502, it adheres less to the sidewall 502b than to the bottom 502a, thereby minimizing or preventing the edge effect. Yet, the adhesion of the color filter material on the bottom 502a of the recess 502 may be maintained because the bottom 502a of the recess 502 may expose a material suitable for the adhesion (in the illustrated embodiment the passivation layer 503). In addition, the protrusion 505a, 505b prevents the color resist from being formed continuously between the sidewall 502b of the recess 502 and the upper surface 501a of the substrate 510. FIG. 5G illustrates the resulting imager structure 500 with a color resist 521 deposited in the recess 502. Although not shown, subsequently, steps for patterning the color resist and steps for forming lenses are conducted, as described above with reference to FIGS. 3F-3I.

Figure 6:
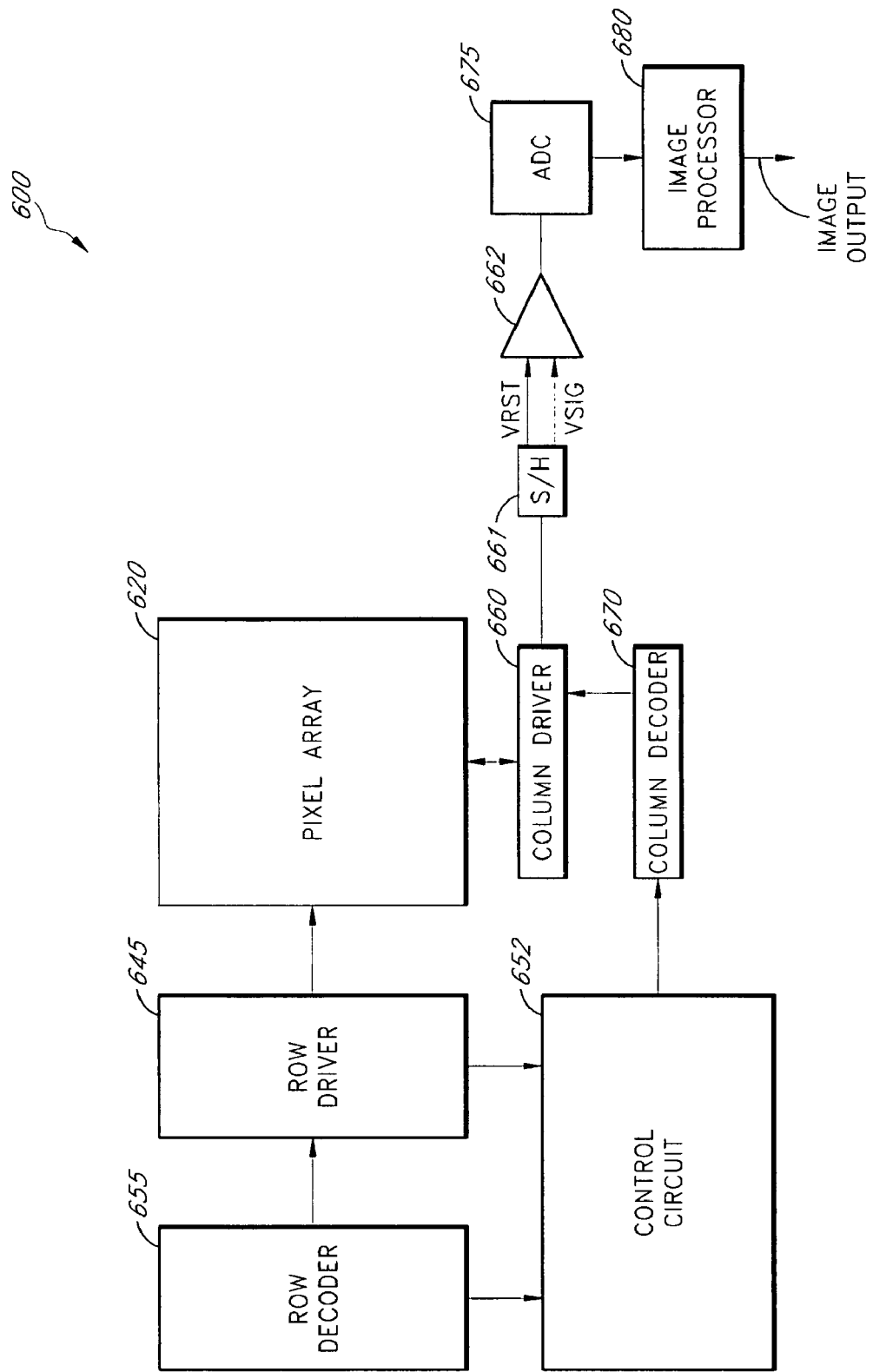
FIG. 6 is a schematic block diagram of an imager employing a recessed color filter array in accordance with one embodiment.

FIG. 6 illustrates a block diagram of a semiconductor imager 600 constructed in accordance with one of the embodiments described above. The imager 600 contains an array of pixels 620 and employs a sidewall spacer within the recess according to one of the embodiments shown in FIGS. 3-5. Attached to the pixel array 620 is signal processing circuitry for controlling the pixel array 620. The pixel cells of each row in the array 620 are all turned on at the same time by a row select line, and the pixel cells of each column are selectively output by respective column select lines. A plurality of row select and column select lines are provided for the entire array 620. The row lines are selectively activated by a row driver 645 in response to a row address decoder 655. The column select lines are selectively activated by a column driver 660 in response to a column address decoder 670. Thus, a row and column address is provided for each pixel cell.

The imager 600 is operated by a timing and control circuit 652, which controls the address decoders 655, 670 for selecting the appropriate row and column lines for pixel readout. The control circuit 652 also controls the row and column driver circuitry 645, 660 such that they apply driving voltages to the drive transistors of the selected row and column lines. The pixel column signals, which typically include a pixel reset signal $V_{rst}$ and a pixel image signal $V_{sig}$, are output to the column driver 660, on output lines, and are read by a sample and hold circuit 661. $V_{rst}$ is read from a pixel cell immediately after the pixel cell's floating diffusion region is reset. $V_{sig}$ represents the amount of charges generated by the photosensitive element of the pixel cell in response to applied light during an integration period. A differential signal $(V_{rst}-V_{sig})$ is produced by a differential amplifier 662 for each readout pixel cell. The differential signal is digitized by an analog-to-digital converter 675 (ADC). The analog-to-digital converter 675 supplies the digitized pixel signals to an image processor 680, which forms and outputs a digital image.

Figure 7:
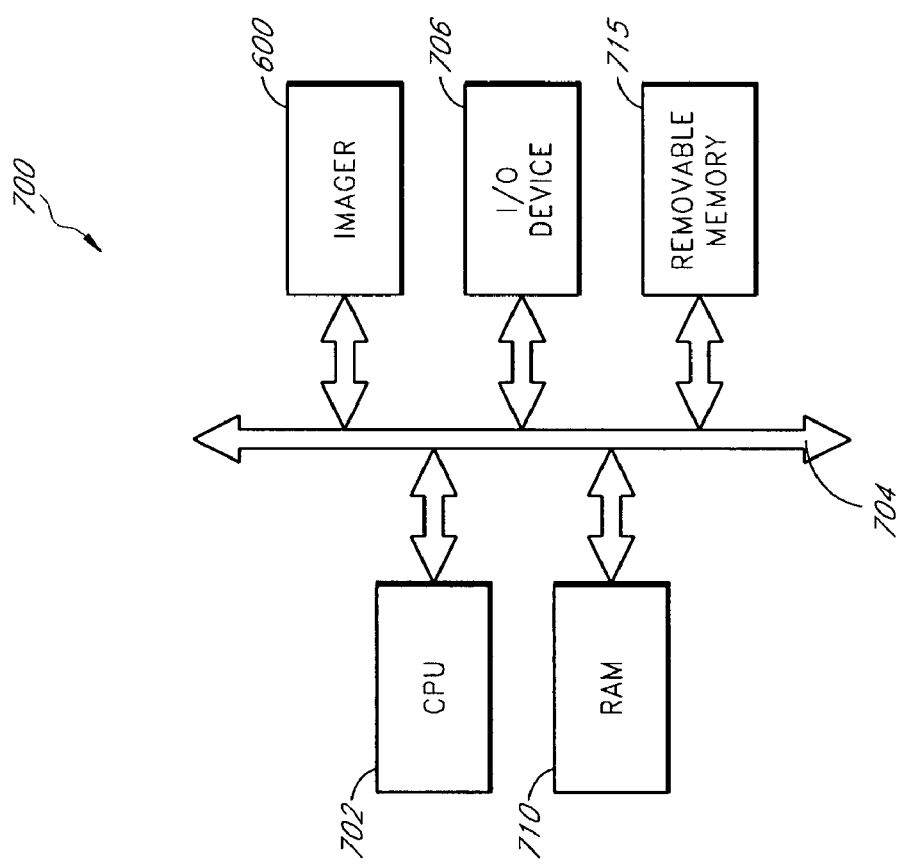
FIG. 7 is a schematic block diagram of a computer system having an imager employing a recessed color filter array in accordance with one embodiment.

FIG. 7 illustrates a processor system 700 that includes an imager 600 constructed in accordance with an embodiment. As discussed above, the imager 600 contains an array of pixels and employs a sidewall spacer within the recess according to any embodiment shown in FIGS. 3-5. The system 700 has digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other imaging sensing and/or processing system.

The system 700, for example a camera system, generally includes a central processing unit (CPU) 702, such as a microprocessor, that communicates with an input/output (I/O) device 706 over a bus 704. The imager 600 also communicates with the CPU 702 over the bus 704. The processor system 700 also includes a random access memory (RAM) 710, and may include a removable memory 715, such as a flash memory, which also communicates with the CPU 702 over the bus 704. The imager 600 may be combined with a processor, such as a CPU, digital signal processor, or microprocessor, with or without memory storage on a single integrated circuit or on a different chip than the processor.

In the embodiments described above, the adhesion-reduction layer on the sidewall of the recess provides a surface energy difference between the bottom and sidewall of the recess. In addition, in some of the embodiments described above, the protrusion at the edge of the recess prevents the color filter materials from being formed continuously between the sidewall of the recess and the upper surface of the substrate. These configurations minimize or prevent the edge effect during deposition of the color filter materials. Thus, the resulting color filters have a substantially uniform thickness across the array, including the edge regions of the array. Yet, the adhesion of the color filter materials on the bottom of the recess may be maintained because the bottom of the recess may include a material suitable for the adhesion.

One embodiment is a method of making a semiconductor imaging device. The method includes providing a substrate having an upper surface. Then, a recess is formed into the upper surface of the substrate. The recess has a bottom and a sidewall. A sidewall spacer is formed on the sidewall of the recess. Then, a color filter layer is formed within the recess after forming the sidewall spacer.

Another embodiment is a method of making a CMOS imager. The method includes providing a substrate having an upper surface and a recess formed into the upper surface. The recess has a bottom and a sidewall. A liner layer is formed at least on the bottom of the recess. The liner layer is formed of a first material having a first surface energy. Then, the sidewall of the recess is treated so as to have a second surface energy lower than the first surface energy. For example, a layer or spacer having a low surface energy may be formed on the sidewall of the recess.

Yet another embodiment is a semiconductor imaging device. The device includes a substrate having an upper surface. The substrate includes a recess formed into the upper surface. The recess includes a bottom and a sidewall. The device also includes a sidewall spacer formed on the sidewall of the recess. The device further includes an array of color filters formed on the bottom of the recess.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment may be incorporated into other embodiments as well. Accordingly, the scope of the present invention is defined only by reference to the appended claims.

What is claimed is:

1. A semiconductor imaging device comprising:
a die including a substrate having an upper surface, the substrate including a recess formed into the upper surface, the recess including a bottom and a sidewall;
a sidewall spacer formed on the sidewall of the recess, wherein the sidewall spacer comprises a layer that does not extend across the recess, wherein the spacer is formed of an organic material; and
an array of color filters formed on the bottom of the recess.

2. The device of claim 1, wherein the bottom of the recess includes a first material having a first surface energy, and wherein the spacer is formed of a second material having a second surface energy lower than the first surface energy.

3. The device of claim 2, wherein the first surface energy is from about 55 dynes/cm$^2$ to about 65 dynes/cm$^2$.

4. The device of claim 2, wherein the second surface energy is not greater than about 40 dynes/cm$^2$.

5. The device of claim 2, wherein the color filters are formed of a color resist having a third surface energy greater than the second surface energy.

6. The device of claim 5, wherein the color resist comprises at least one of propylene glycol monomethyl ether acetate (PGMEA), ethyl 3-ethoxypropionate (EEP), cyclohexanone and acrylic resin.

7. The device of claim 1, wherein the bottom of the recess is defined by a dielectric material.

8. The device of claim 7, wherein the dielectric material comprises silicon nitride ($Si_3N_4$).

9. The device of claim 1, wherein the organic material comprises a self-assembled monolayer material.

10. The device of claim 9, wherein the self-assembled monolayer material comprises a fluorinated self-assembled monolayer material.

11. The device of claim 10, wherein the fluorinated self-assembled monolayer material comprises 1H, 1H, 2H, 2H-perfluorodecyltrichlorosilane (FDTS).

12. The device of claim 1, further comprising a passivation layer on the bottom of the recess.

13. The device of claim 12, wherein the passivation layer is formed of silicon nitride ($Si_3N_4$).

14. The device of claim 12, wherein the passivation layer further comprises a portion interposed between the spacer and the sidewall of the recess.

15. The device of claim 1, further comprising a protrusion extending from an edge of the recess where the sidewall of the recess meets an upper surface of the substrate.

16. The device of claim 15, wherein the protrusion extends substantially horizontally over the recess.

17. The device of claim 15, wherein the protrusion extends substantially vertically.

18. The device of claim 15, wherein the sidewall spacer further comprises a portion at least partially covering the protrusion.

19. The device of claim 18, further comprising a passivation layer interposed between the protrusion and the portion of the spacer.

20. The device of claim 1, further comprising a plurality of photodiodes embedded in the substrate under the bottom of the recess.

21. The device of claim 1, further comprising one or more conductive lines embedded in the substrate, the conductive lines being positioned lateral to the recess.

22. The device of claim 1, wherein the recess has a depth from about 1 µm to about 3 µm.

23. The device of claim 1, wherein the substrate has no more than one recess.

24. The device of claim 1, wherein the array of color filters is formed inside the recess, and has substantially the same thickness in an edge region extending along and adjacent to the sidewall of the recess as a thickness of a central region of the array.

25. The device of claim 24, wherein the edge region has a width of about 50 µm to about 100 µm from the sidewall.

* * * * *